(No Model.)
W. R. O'NEILL.
BICYCLE.
No. 444,639. Patented Jan. 13, 1891.
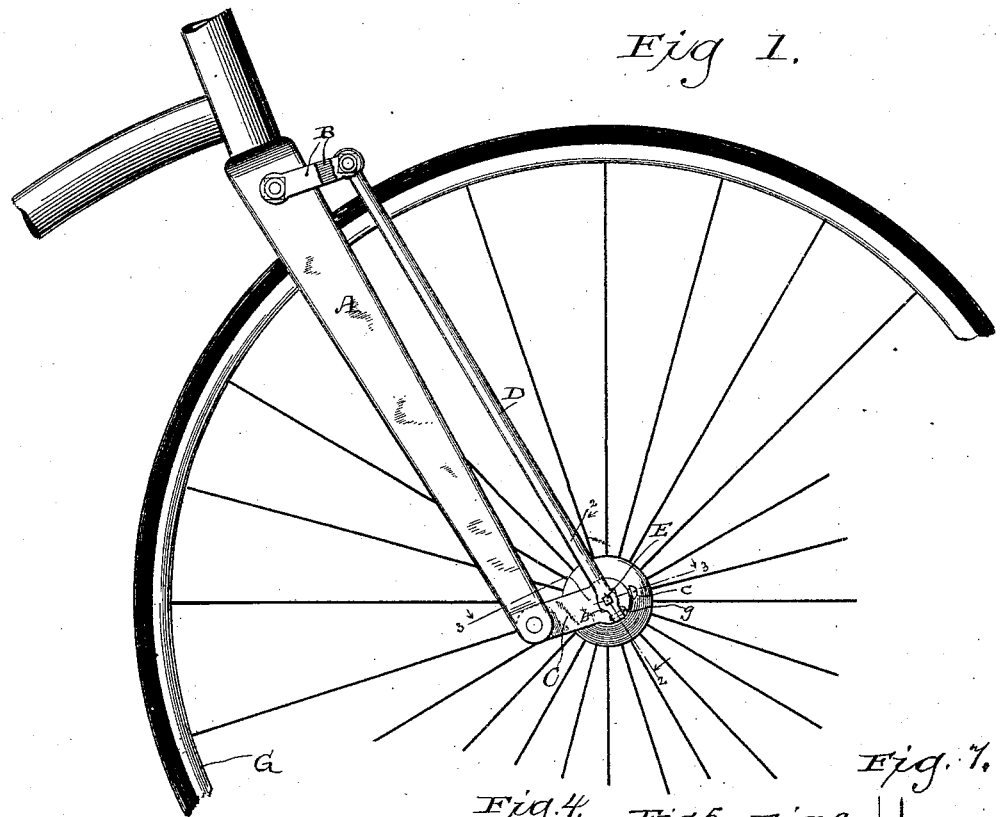
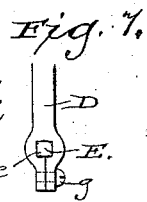
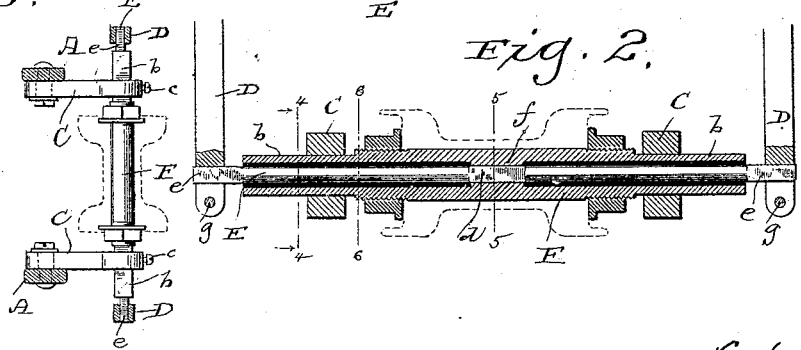
Witnesses
Geo. W. Young
N. E. Oliphant
Inventor
William R. O'Neill
By H. G. Underwood
Attorney

UNITED STATES PATENT OFFICE.

WILLIAM R. O'NEILL, OF MILWAUKEE, WISCONSIN.

BICYCLE.

SPECIFICATION forming part of Letters Patent No. 444,639, dated January 13, 1891.

Application filed September 15, 1890. Serial No. 365,014. (No model.)

*To all whom it may concern:*

Be it known that I, WILLIAM R. O'NEILL, of Milwaukee, in the county of Milwaukee, and in the State of Wisconsin, have invented certain new and useful Improvements in Bicycles and Analogous Vehicles; and I do hereby declare that the following is a full, clear, and exact description thereof.

My invention consists in certain peculiarities of construction and combination of parts to be hereinafter described with reference to the accompanying drawings and subsequently claimed.

In the drawings, Figure 1 represents a portion of a bicycle provided with my improvements; Figs. 2 and 3, sections respectively taken on lines 2 2 and 3 3 of the preceding figure; Figs. 4, 5, and 6, sections respectively taken on lines 4 4, 5 5, and 6 6 of Fig. 2; and Fig. 7, a detail side elevation illustrating the connection of a lever-arm and torsion-bar that constitute parts of my said improvements.

Referring by letter to the drawings, A represents a fork of a bicycle or analogous vehicle. Pivotally connected to branches of the fork are upper and lower links B C, the latter links being preferably at the outer extremities of said fork branches, as best illustrated in Fig. 1, and, as shown in the same figure, the upper links on each side of the machine are connected to rods D, the latter being parallel to the adjacent branch of said fork.

I have illustrated the rods D as pivotally connected at their upper extremities to the links B and rigidly secured at their lower extremities to a transverse bar E, of spring-steel, this bar being fast at its center within a sleeve F, that serves as a bearing or axle for the hub of an ordinary bicycle-wheel G, and fitted on the sleeve are the outer ends of the links C, above described. In the drawings the sleeve is shown as having squared extremities $b$ fitted in corresponding openings in the links C, and in order to make the fit more secure I may employ set-screws $c$, the latter being also employed in case the extremities of said sleeve are made round, as sometimes occurs.

As best illustrated in Fig. 2, the center $d$ and ends $e$ of the spring-bar E are squared, said center being fitted in a web $f$ in the sleeve F and said ends inserted in squared openings in the rods D, the lower ends of the latter being shown as split and clamped to said spring-bar by means of set-screws $g$, as best illustrated in Fig. 7.

While I have shown the spring-bar E as arranged in the sleeve F and connecting the lower ends of the rods D, I do not wish to be understood as limiting myself to this construction and arrangement of parts, as said bar or an additional one may be employed to connect the upper ends of said rods, it being a fundamental feature of my invention to have either or both ends of these rods rigidly connected to such a bar, or, in other words, to so arrange a spring that a torsional resistance will be exerted in opposition to the vibrations of the fork and wheel.

In the operation of my invention, as shown, the weight of the rider causes the spring-bar E to exert a certain amount of torsional force on account of the twisting of the same by the leverage of the rods D, that connect the links B and said spring-rod, this leverage being exerted when the vehicle is mounted because of the downward movement of the branches of the fork A, pivotally connected to said links, due to the weight of the rider, it being obvious that both pairs of links move together on arcs of circles, while the fork branches and rods D move in opposite directions on parallel lines, thus causing the spring-bar E to twist against its rigid center. Now if there be inequalities in the path of the vehicle there will be a variable degree of tension on the spring-bar E, due to the tendency of the wheel G to rise or fall when passing over said inequalities, and thus the jar that would otherwise affect the rider is compensated for by said spring-bar under torsion, while at the same time said wheel is held against lateral movement, whereby the steering of the machine is unaffected, this being a very desirable result.

The construction above described may be applied to any one or all of the wheels of a bicycle or analogous vehicle to form a spring fork or forks for the same, the advantages of such a fork being well known to riders of vehicles to which my invention relates.

Having thus described my invention, what I claim as new, and desire to secure by Letters Patent, is—

1. In a bicycle or analogous vehicle, the combination of a vibratory fork and wheel and a spring arranged to exert torsional resistance to the vibrations of said fork and wheel, substantially as set forth.

2. In a bicycle or analogous vehicle, the combination of a vibratory fork and wheel and a torsion-spring connected to said fork and axle of the wheel, substantially as set forth.

3. In a bicycle or analogous vehicle, the combination of a fork, a wheel-carrying mechanism linked to to the fork, and a rigidly-supported spring-bar connected to said fork and wheel-carrying mechanism, substantially as set forth.

4. In a bicycle or analogous vehicle, a fork, upper and lower links pivotally connected to the fork, an axle connected to the lower links, a wheel arranged on the axle, rods arranged parallel to the fork branches and movable with the links, and a rigidly-supported spring-bar connecting the rods, substantially as set forth.

5. In a bicycle or analogous vehicle, a fork, upper and lower links pivotally connected to the fork, an axle supported by the lower links, a wheel arranged on the axle, rods arranged parallel to the fork branches and connected to the upper links, and a spring-bar having a portion thereof rigidly secured within said axle and likewise connected at its ends to said rods, substantially as set forth.

6. In a bicycle or analogous vehicle, a fork, links pivotally connected to the fork, a spring-controlled axle fast in the links, and a wheel arranged on the axle, substantially as set forth.

7. In a bicycle or analogous vehicle, links pivotally connected to the fork, an axle fast in the links, a wheel arranged on the axle, and a torsion-spring connected to said fork and axle, substantially as set forth.

In testimony that I claim the foregoing I have hereunto set my hand, at Milwaukee, in the county of Milwaukee and State of Wisconsin, in the presence of two witnesses.

WILLIAM R. O'NEILL.

Witnesses:
N. E. OLIPHANT,
WM. KLUG.